(12) United States Patent
Kotreka et al.

(10) Patent No.: US 12,513,642 B2
(45) Date of Patent: Dec. 30, 2025

(54) OPTIMIZED WAY TO VALIDATE THE NTN CELL

(71) Applicant: QUALCOMM Incorporated, San Diego, CA (US)

(72) Inventors: Ravi Kanth Kotreka, Hyderabad (IN); Rajan Kumar, Hyderabad (IN); Pankaj Bansal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/308,604

(22) Filed: Apr. 27, 2023

(65) Prior Publication Data

US 2024/0365269 A1    Oct. 31, 2024

(51) Int. Cl.
*H04W 56/00* (2009.01)
*H04B 7/185* (2006.01)
*H04W 74/0833* (2024.01)

(52) U.S. Cl.
CPC ...... *H04W 56/006* (2013.01); *H04B 7/18513* (2013.01); *H04W 56/0045* (2013.01); *H04W 74/0833* (2013.01)

(58) Field of Classification Search
None
See application file for complete search history.

(56) References Cited

U.S. PATENT DOCUMENTS

| 2021/0352606 | A1 | 11/2021 | Hosseinian et al. | |
| 2022/0201631 | A1* | 6/2022 | Wu | H04W 56/0005 |
| 2022/0330187 | A1 | 10/2022 | Cheng et al. | |
| 2024/0188017 | A1* | 6/2024 | Hu | H04W 76/20 |
| 2024/0397340 | A1* | 11/2024 | Kim | H04W 74/08 |
| 2025/0081142 | A1* | 3/2025 | Hasegawa | G01S 19/34 |
| 2025/0093522 | A1* | 3/2025 | Hu | H04W 24/08 |
| 2025/0126467 | A1* | 4/2025 | Garcia Morchon | H04W 74/0833 |

FOREIGN PATENT DOCUMENTS

| WO | 2023039809 A1 | 3/2023 |
| WO | PCT/CN2022/101872 | * 4/2024 |

OTHER PUBLICATIONS

Author Unknown, Feature lead summary #2 of AI 9.12.3 on improved GNSS operations, Doc. No. R1-2205553, pp. 1-51, May 20, 2022.*
Author Unknown, Improved GNSS Operations for IoT-NTN, pp. 1-7, Doc. No. R1-2303609, pp. 1-7, Apr. 26, 2023.*
International Search Report and Written Opinion—PCT/US2024/018935—ISA/EPO—Jul. 9, 2024.

* cited by examiner

*Primary Examiner* — Christopher M Crutchfield
(74) *Attorney, Agent, or Firm* — Procopio, Cory, Hargreaves & Savitch LLP

(57) ABSTRACT

A UE may identify an offset period associated with an NTN cell based on a SIB. The UE may identify a TA value associated with the NTN cell for the UE based on a location of the UE and a location of a satellite of the NTN cell. The UE may identify whether the TA value associated with the NTN cell for the UE is less than the offset period associated with the NTN cell. The UE may block the NTN cell for a first duration or until a reboot of the UE if the TA value associated with the NTN cell for the UE is greater than the offset period associated with the NTN cell.

26 Claims, 9 Drawing Sheets

OPTIMIZED WAY TO VALIDATE THE NTN CELL

TECHNICAL FIELD

The present disclosure relates generally to communication systems, and more particularly, to validation of a non-terrestrial network (NTN) cell based on timing configurations in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may identify an offset period associated with an NTN cell based on a system information block (SIB). The apparatus may identify a timing advance (TA) value associated with the NTN cell for the UE based on a location of the UE and a location of a satellite of the NTN cell. The apparatus may identify whether the TA value associated with the NTN cell for the UE is less than the offset period associated with the NTN cell. The apparatus may block the NTN cell for a first duration or until a reboot of the UE if the TA value associated with the NTN cell for the UE is greater than the offset period associated with the NTN cell.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
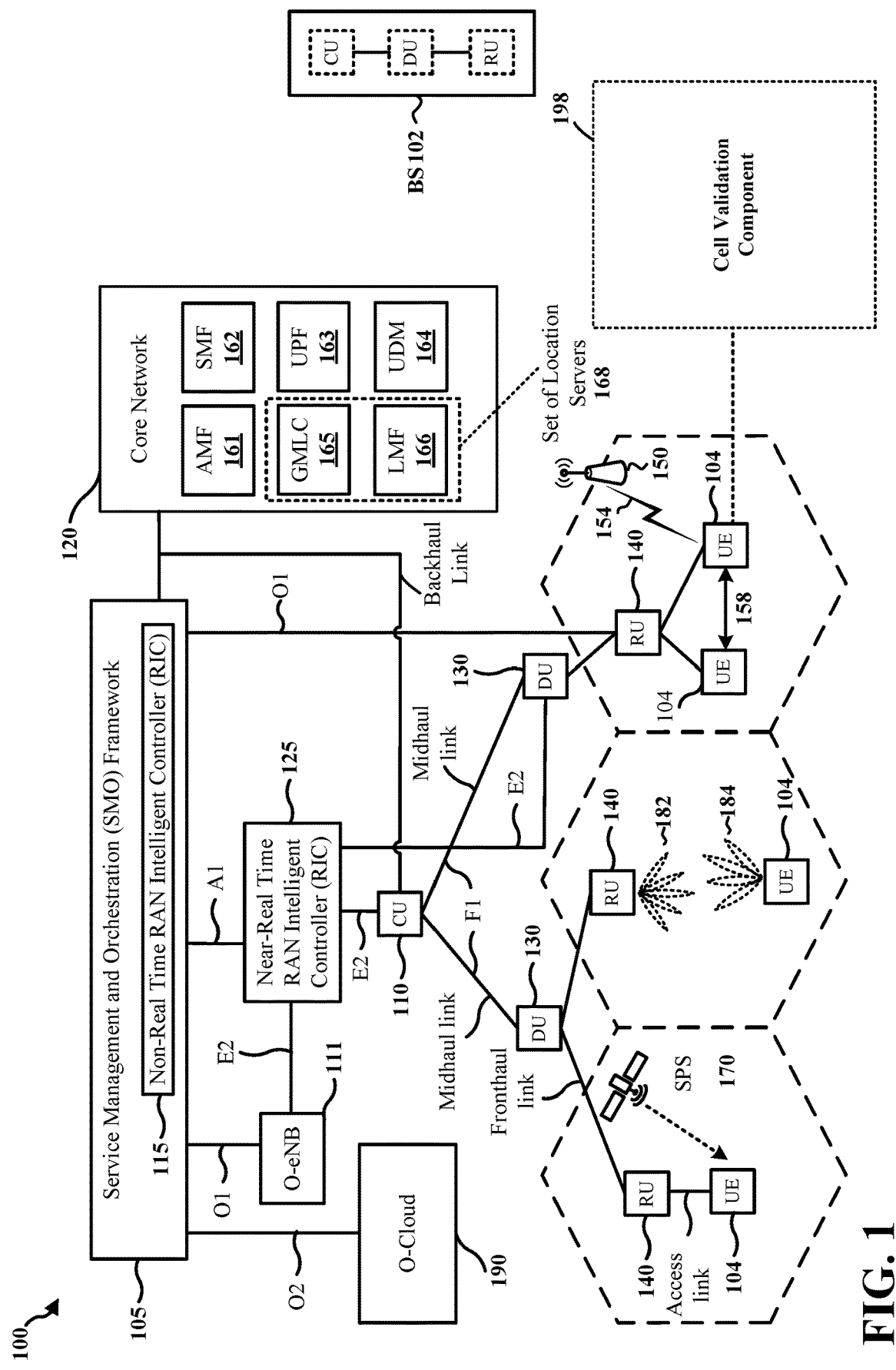
FIG. 1 is a diagram illustrating an example of a wireless communications system and an access network.

In an NTN, even if the TA value is greater than the Koffset value, a UE may still proceed to send Message 1 (Msg1) to initiate the random access channel (RACH) procedure as normal, where the transmission timing of the Msg1 may be compensated using the UE-calculated TA value. It may not make sense to send Msg1 when the TA value exceeds the Koffset value because sending Msg1 under the circumstances may violate causality. In other words, the UE may initiate the RACH procedure for all cases irrespective of the relationship between the TA value and the Koffset value. With this approach, even if the TA value is greater than Koffset value, causing causality violation, the UE may still initiate the RACH procedure with timing compensation based on the UE-calculated TA value. Since this RACH procedure attempt is bound to fail, initiating the RACH procedure may provide no benefit and may serve just to consume and waste resources. This not just drains the UE's power as the UE attempts multiple RACH procedures, but it also increases unnecessary traffic on an already expensive link (i.e., the NTN link), leading to additional delays for the UE in finding a suitable cell.

In some examples, a UE may identify an offset period associated with an NTN cell based on a SIB. The UE may identify a TA value associated with the NTN cell for the UE based on a location of the UE and a location of a satellite of the NTN cell. The UE may identify whether the TA value associated with the NTN cell for the UE is less than (or equal to) the offset period associated with the NTN cell. The UE may block the NTN cell for a first duration or until a reboot of the UE if the TA value associated with the NTN cell for the UE is greater than the offset period associated with the NTN cell.

Particular aspects of the subject matter described in this disclosure can be implemented to realize one or more of the following potential advantages. For example, as the UE may avoid initiating the RACH procedure where causality would be violated, power and UE resources may be saved. Further, the overall traffic on the expensive satellite link may be reduced as the unnecessary Msg1 transmissions may be avoided. Moreover, the chances for the UE to find a suitable cell (e.g., a cell for which the RACH procedure may be successfully completed without a large number of retires) may also be improved.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.)

may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a cell validation component 198 that may be configured to identify an offset period associated with an NTN cell based on a SIB. The cell validation component 198 may be configured to identify a TA value associated with the NTN cell for the UE based on a location of the UE and a location of a satellite of the NTN cell. The cell validation component 198 may be configured to identify whether the TA value associated with the NTN cell for the UE is less than the offset period associated with the NTN cell. The cell validation component 198 may be configured to block the NTN cell for a first duration or until a reboot of the UE if the TA value associated with the NTN cell for the UE is greater than the offset period associated with the NTN cell. Accordingly, a UE may invalidate/block an NTN cell where the TA value is greater than the Koffset value.

Figure 2:
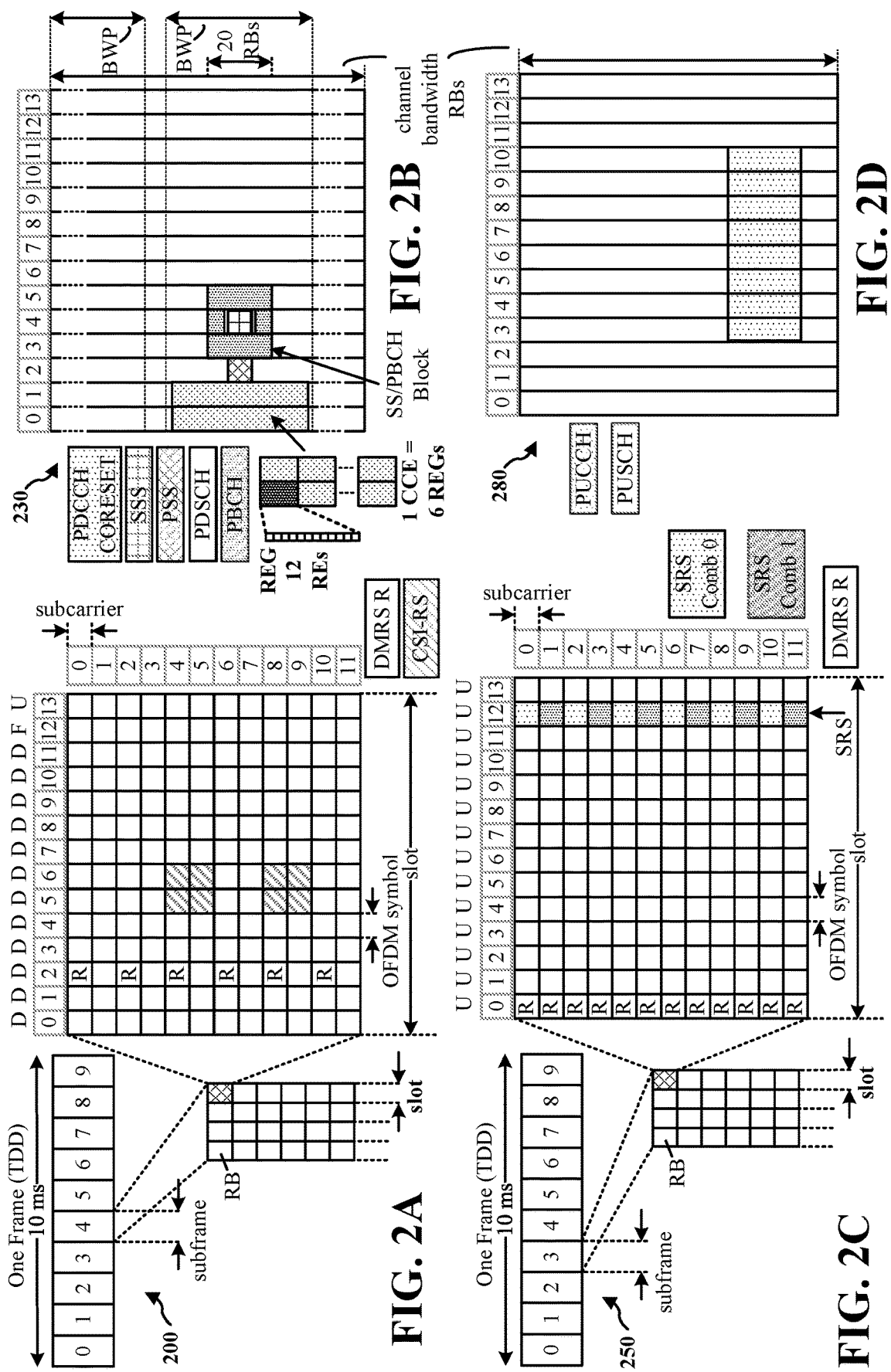
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
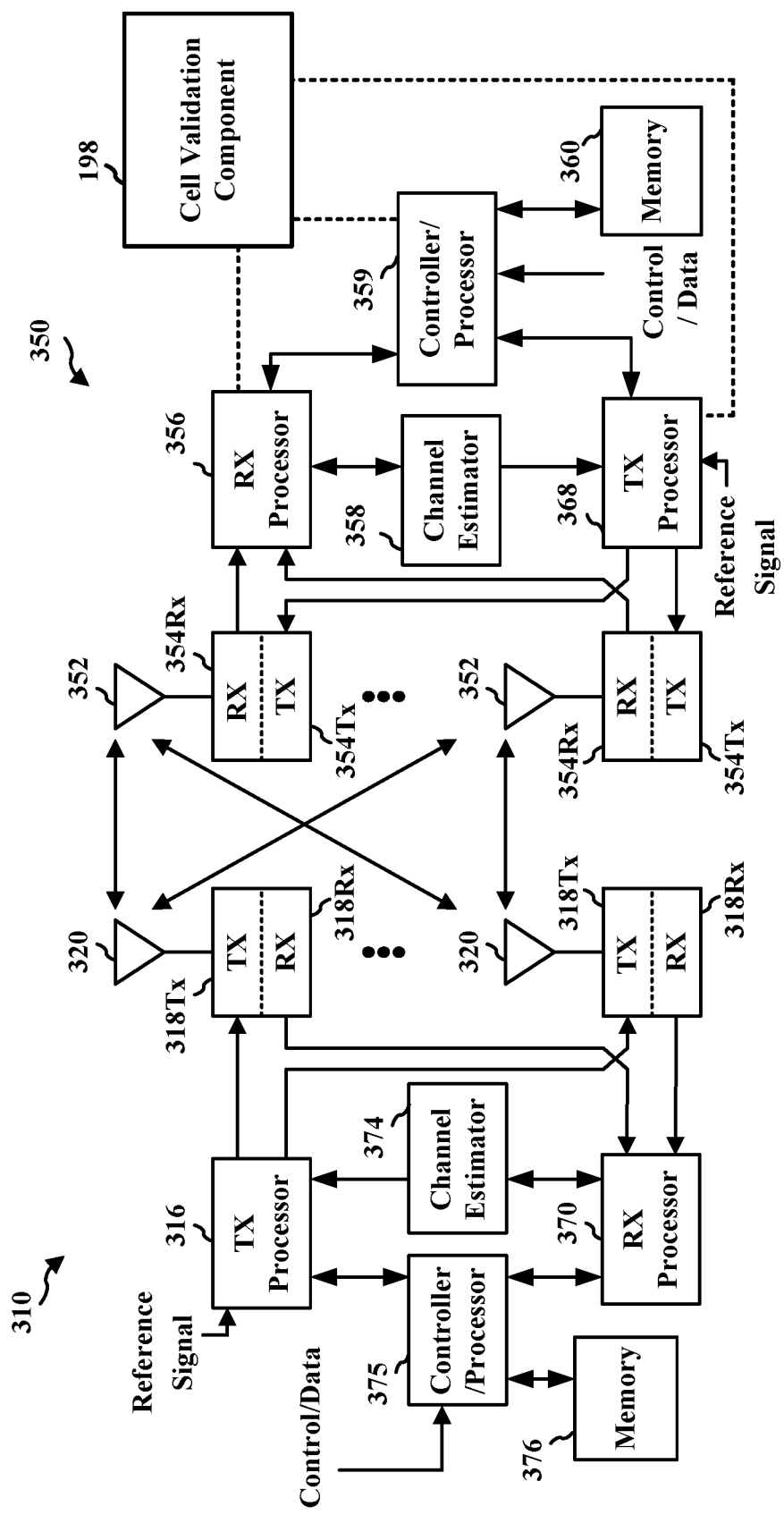
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving. rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the cell validation component 198 of FIG. 1.

An NTN system may operate as follows: The UE may check for the Koffset (k-Offset, k_offset) (e.g., a scheduling offset for the NTN system) value present in SIB 31 (SIB31). Based on the UE's current location and satellite ephemeris data, the UE may calculate the TA (also referred to as a TA delay) value for the UE. The UE may then utilize the TA value for the UE to perform timing compensation for Msg1 in a RACH procedure. When the TA value is less than the Koffset value, it may be appropriate for the UE to send Msg1 to initiate the RACH procedure after the UE compensates for the TA.

However, even if the TA value is greater than the Koffset value, the UE may still proceed to send Msg1 as normal, where the transmission timing of the Msg1 may be compensated using the UE-calculated TA value. It may not make sense to send Msg1 when the TA value exceeds the Koffset value because sending Msg1 under the circumstances may violate causality. In other words, the UE may initiate the RACH procedure for all cases irrespective of the relationship between the TA value and the Koffset value. With this approach, even if the TA value is greater than Koffset value, causing causality violation, the UE may still initiate the RACH procedure with timing compensation based on the UE-calculated TA value. Since this RACH procedure attempt is bound to fail, initiating the RACH procedure may provide no benefit and may serve just to consume and waste resources. This process not just drains the UE's power as the UE attempts multiple RACH procedures, but it also increases unnecessary traffic on an already expensive link (i.e., the NTN link), leading to additional delays for the UE in finding a suitable cell.

Figure 4:
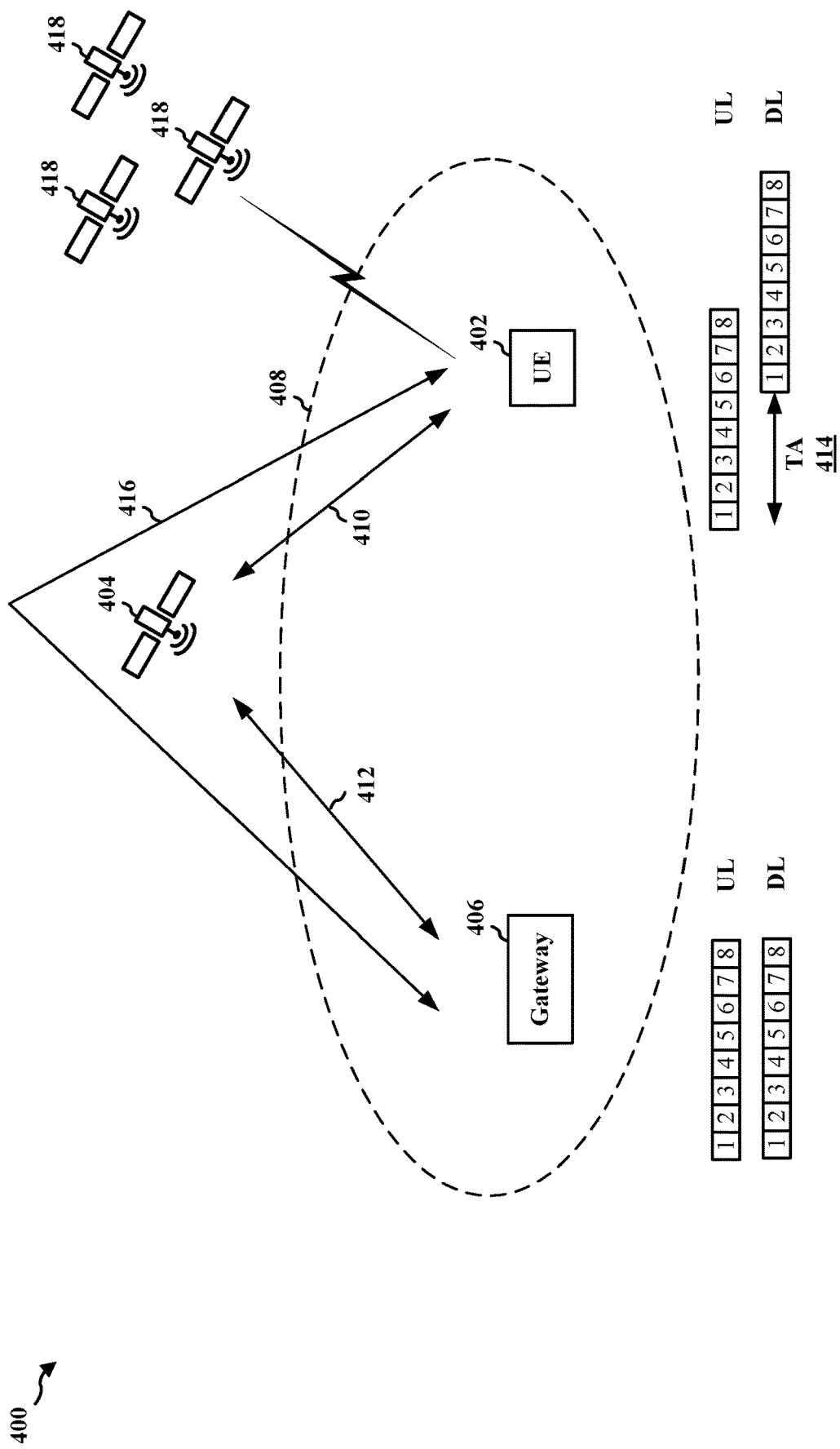
FIG. 4 illustrates an example of a wireless communications system in accordance with aspects of the present disclosure.

FIG. 4 illustrates an example of a wireless communications system 400 in accordance with aspects of the present disclosure. In some examples, wireless communications system 400 may implement aspects of wireless communications system 100. The wireless communications system 400 may be an NTN, which may include a satellite 404 that is located in the Earth's orbit. The satellite 404 may correspond to an NTN cell 408 of the wireless communications system 400. The satellite 404 may relay communications between base stations (e.g., the gateway 406) and mobile terminals (e.g., the UE 402) that are located on Earth. The UE 402 may communicate with the satellite 404 when the UE 402 is located within the NTN cell 408. The link between the UE 402 and the satellite 404 may be referred to as a service link 410. Further, the link between the gateway 406 and the satellite 404 may be referred to as a feeder link 412. Moreover, the UE 402 may determine its own location based on signals received from satellites 418 of a GNSS.

The UE 402 may use the TA 414 (i.e., an advance of the UL transmission in relation to reception on the DL) to adjust the transmission timing of the UE 402 to compensate for the propagation delay (e.g., the round trip time (RTT) over the feeder link 412 and the service link 410) and maintain accurate timing alignment and synchronization with the network. From a SIB31, the UE 402 may obtain the Koffset 416 value for the NTN cell 408. If Kmac (i.e., k-Mac, k_mac) is equal to 0, Koffset may be the overall scheduling offset, and may need to be greater than or equal to the sum of the service link RTT and the feeder link delay. Further, if Kmac is not equal to 0, Koffset may be a configured scheduling offset that may need to be greater than or equal to the sum of the service link RTT and the common TA (the common TA may be associated with the feeder link). Moreover, Kmac may be a configured offset that may need to be greater than or equal to the RTT between the reference point (RP) and the ground gateway 406. Therefore, by definition, the TA value may be max (Koffset+Kmac). Further, if Kmac is equal to 0, the TA may be at the maximum Koffset value, which means a TA value greater than the Koffset may be infeasible and invalid.

Figure 5:
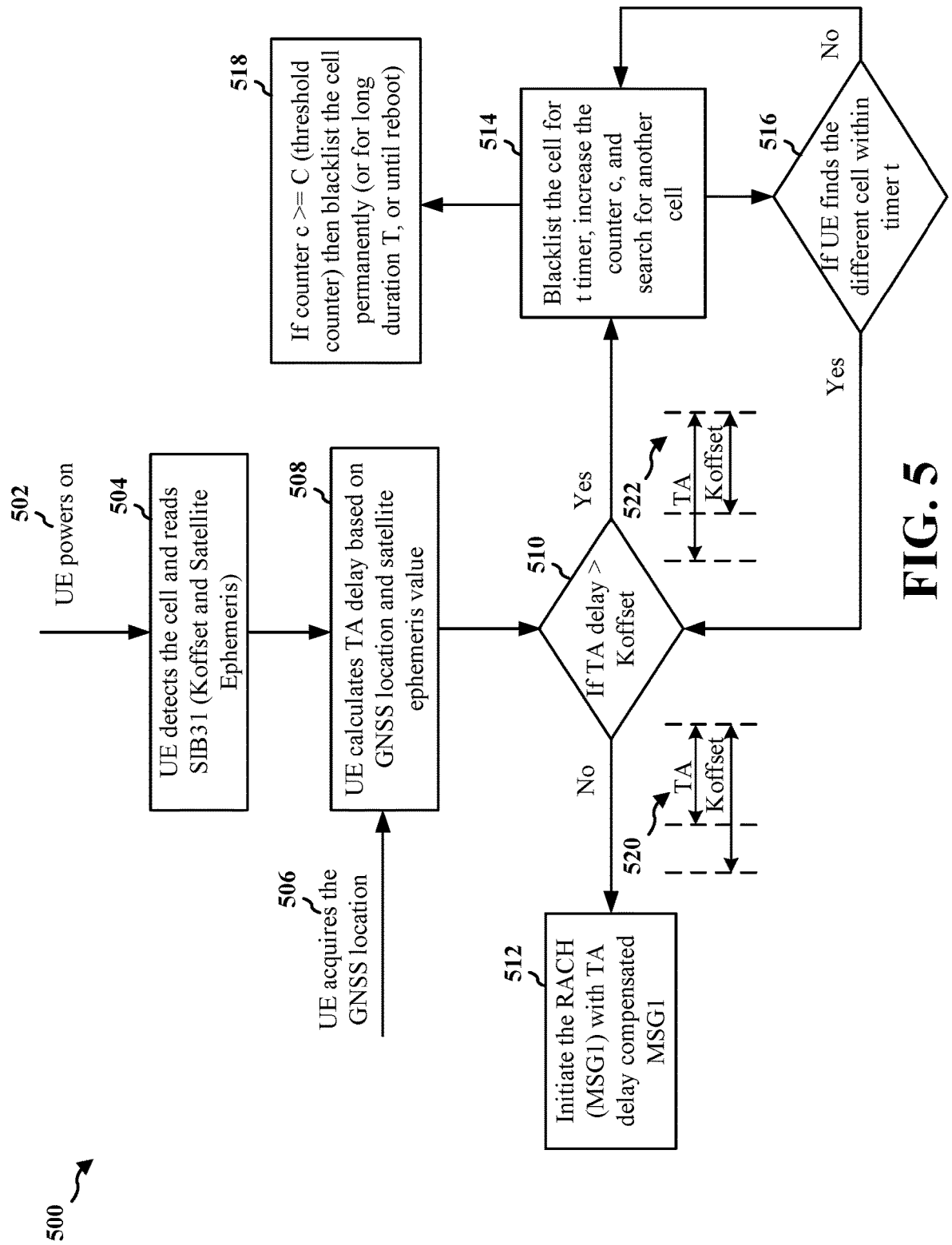
FIG. 5 is a flow diagram illustrating a method of wireless communication according to one or more aspects.

FIG. 5 is a flow diagram 500 illustrating a method of wireless communication according to one or more aspects. At 502, the UE may power on. At 504, the UE may detect an NTN cell, and may obtain a SIB (e.g., a SIB31) of the NTN cell. From the SIB, the UE may obtain the Koffset (e.g., an NTN cell scheduling offset) value for the NTN cell and the ephemeris data for the satellite corresponding to the NTN cell. The UE may determine the current location of the satellite based on the ephemeris data. At 506, the UE may acquire the location of the UE (i.e., its own location) (e.g., via a navigation satellite system, such as a GNSS).

At 508, the UE may calculate the TA value for the UE based on the location of the UE and the location of the satellite. A TA value may be used to adjust the transmission timing of a UE to compensate for the propagation delay and maintain accurate timing alignment and synchronization with the network. In particular, the TA value (TA_NTN) may be calculated as a sum of a UE-specific TA component (TA_UE) and a common TA (TA_COMMON) (the common TA may be associated with the feeder link). The UE-specific TA component may be calculated based on the follows: TA_UE=2*D/c/T, where D may be the distance between the UE and the satellite (i.e., the service link distance), which may be determined based on the location of the UE and the location of the satellite, c may be the speed of light, and T may be a preconfigured value (e.g., 1/1.92 MHZ).

At 510, the UE may determine whether the TA value is greater than the Koffset value. If the TA value is less than (or equal to) the Koffset value (e.g., as shown in the diagram 520), at 512, the UE may initiate the RACH procedure with the NTN cell (which may include sending Msg1). The transmission of Msg1 may include timing compensation based on the TA value. On the other hand, if the TA value is greater than the Koffset value (e.g., as shown in the diagram 522), at 514, the UE may block (blacklist) the NTN cell based on a timer with a duration t (e.g., a first duration) (or until a reboot of the UE). The UE may also increment/increase a counter c, and may search for another suitable cell. At 516, before the expiry of the timer with the duration t, the UE may find another suitable cell (e.g., another NTN cell where the TA value for the UE is less than the Koffset value), and may access that cell instead (e.g., after performing the RACH procedure with the cell).

At 518, if the value of the counter c reaches a threshold C, the UE may block (blacklist) the NTN cell permanently (or based on another timer with a long duration T (T>t) (e.g., a second duration), or until a reboot of the UE).

Figure 6:
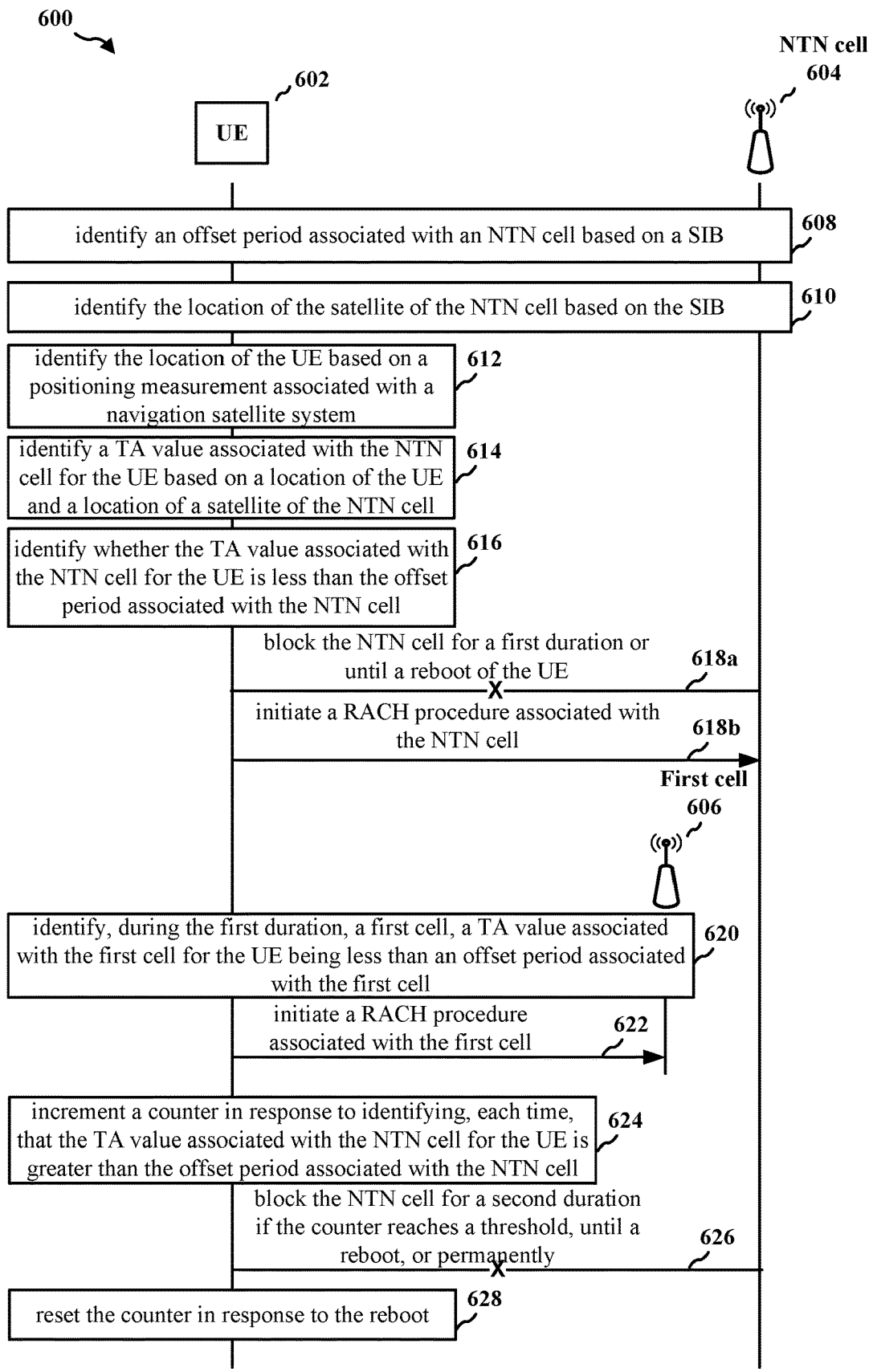
FIG. 6 is a diagram of communication flow of a method of wireless communication.

FIG. 6 is a diagram of a communication flow 600 of a method of wireless communication. The UE 602 may implement aspects of the UE 104/350/402, and may perform operations illustrated in FIG. 5. At 608, the UE 602 may identify an offset period (e.g., the Koffset) associated with an NTN cell 604 based on a SIB.

In one configuration, the SIB may be a SIB 31.

In one configuration, at 610, the UE 602 may identify the location of the satellite of the NTN cell 604 based on the SIB.

In one configuration, at 612, the UE 602 may identify the location of the UE 602 based on a positioning measurement associated with a navigation satellite system.

In one configuration, at 614, the UE 602 may identify a TA value associated with the NTN cell 604 for the UE 602 based on a location of the UE 602 and a location of a satellite of the NTN cell 604.

At 616, the UE 602 may identify whether the TA value associated with the NTN cell 604 for the UE 602 is less than (or equal to) the offset period associated with the NTN cell 604.

At 618*a*, the UE 602 may block the NTN cell 604 for a first duration or until a reboot of the UE 602 if the TA value associated with the NTN cell 604 for the UE 602 is greater than the offset period associated with the NTN cell 604.

In one configuration, at 618*b*, the UE 602 may initiate a RACH procedure associated with the NTN cell 604 if the TA value associated with the NTN cell 604 for the UE 602 is less than (or equal to) the offset period associated with the NTN cell 604.

In one configuration, at 620, the UE 602 may identify, during the first duration, a first cell 606. A TA value associated with the first cell 606 for the UE 602 may be less than an offset period (e.g., the Koffset) associated with the first cell 606.

At 622, the UE 602 may initiate a RACH procedure associated with the first cell 606.

In one configuration, at 624, the UE 602 may increment a counter in response to identifying, each time, that the TA value associated with the NTN cell 604 for the UE 602 is greater than the offset period associated with the NTN cell 604.

At 626, the UE 602 may block the NTN cell 604 for a second duration if the counter reaches a threshold, until a reboot, or permanently. The second duration may be greater than the first duration.

In one configuration, at 628, the UE 602 may reset the counter in response to the reboot. In one configuration, the UE 602 may also reset the timer associated with the second duration in response to the reboot.

Figure 7:
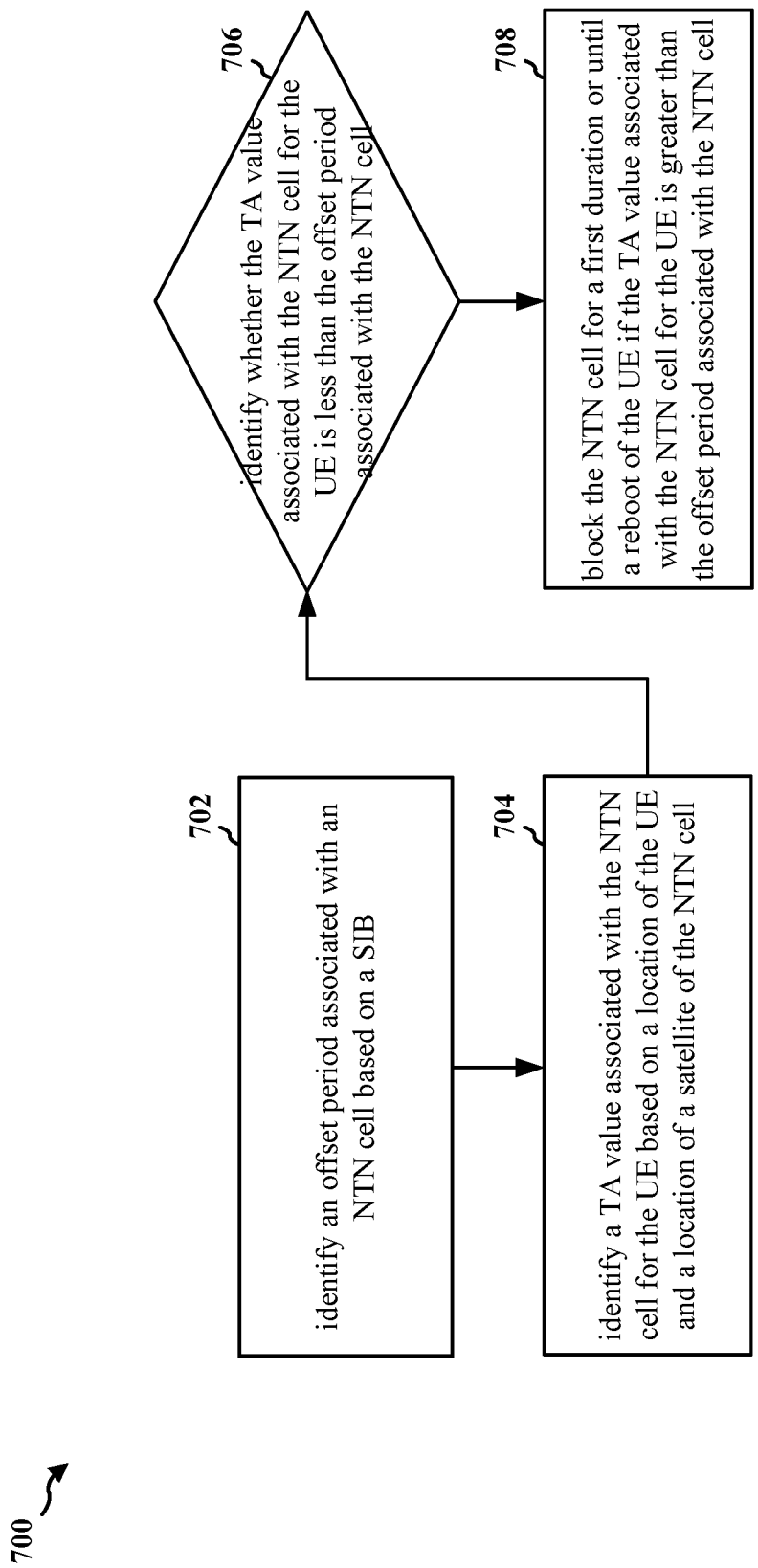
FIG. 7 is a flowchart of a method of wireless communication.

FIG. 7 is a flowchart 700 of a method of wireless communication. The method may be performed by a UE (e.g., the UE 104/350/402/602; the apparatus 904). At 702, the UE may identify an offset period associated with an NTN cell based on a SIB. For example, 702 may be performed by the component 198 in FIG. 9. Referring to FIG. 6, at 608, the UE 602 may identify an offset period associated with an NTN cell 604 based on a SIB. Further, 702 may correspond to 504 in FIG. 5.

At 704, the UE may identify a TA value associated with the NTN cell for the UE based on a location of the UE and a location of a satellite of the NTN cell. For example, 704 may be performed by the component 198 in FIG. 9. Referring to FIG. 6, at 614, the UE 602 may identify a TA value associated with the NTN cell 604 for the UE 602 based on a location of the UE 602 and a location of a satellite of the NTN cell 604. Further, 704 may correspond to 508 in FIG. 5.

At 706, the UE may identify whether the TA value associated with the NTN cell for the UE is less than the offset period associated with the NTN cell. For example, 706 may be performed by the component 198 in FIG. 9. Referring to FIG. 6, at 616, the UE 602 may identify whether the TA value associated with the NTN cell 604 for the UE 602 is less than the offset period associated with the NTN cell 604. Further, 706 may correspond to 510 in FIG. 5.

At 708, the UE may block the NTN cell for a first duration or until a reboot of the UE if the TA value associated with the NTN cell for the UE is greater than the offset period associated with the NTN cell. For example, 708 may be performed by the component 198 in FIG. 9. Referring to FIG. 6, at 618*a*, the UE 602 may block the NTN cell 604 for a first duration or until a reboot of the UE 602 if the TA value associated with the NTN cell 604 for the UE 602 is greater than the offset period associated with the NTN cell 604. Further, 708 may correspond to 514 in FIG. 5.

Figure 8:
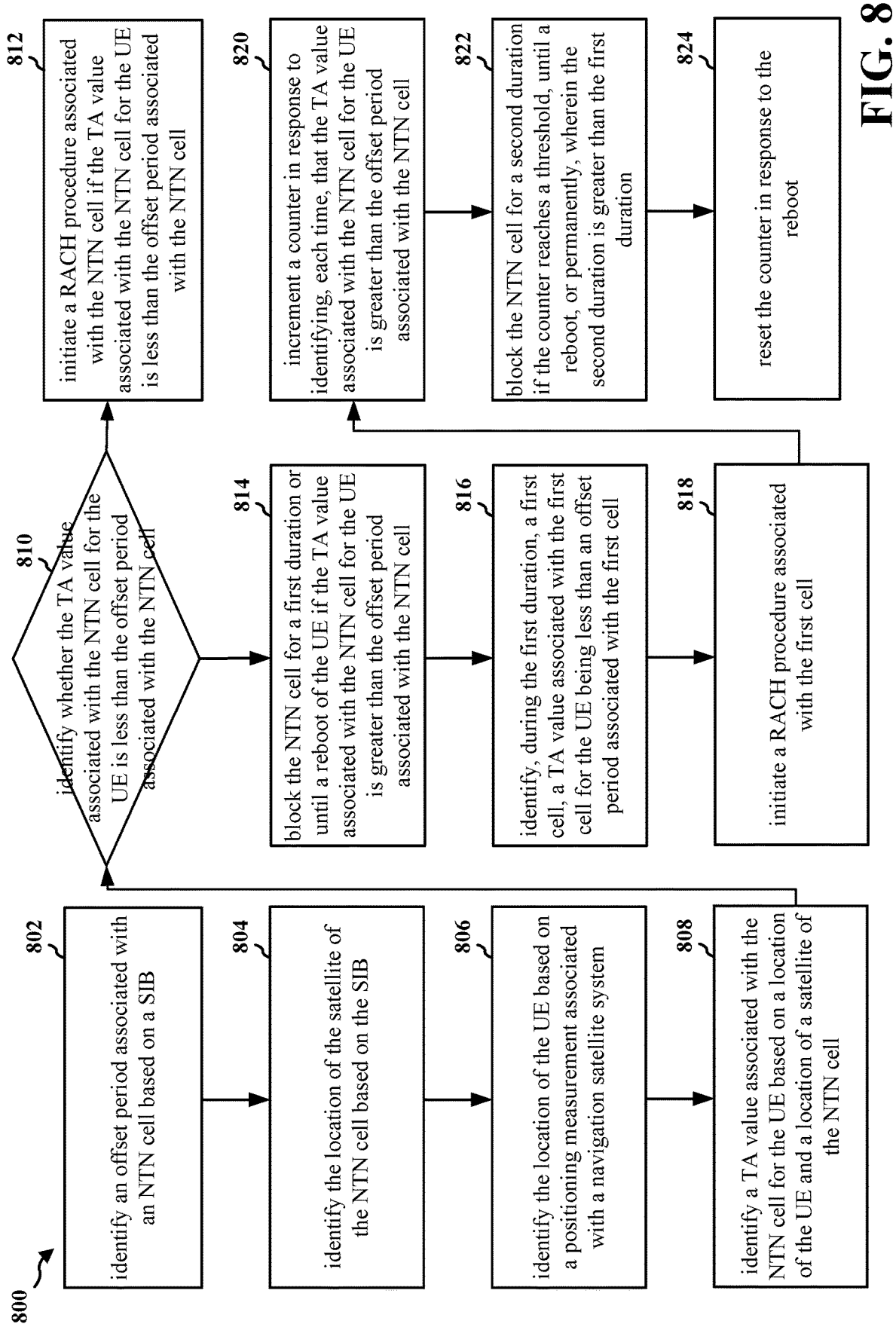
FIG. 8 is a flowchart of a method of wireless communication.

FIG. 8 is a flowchart 800 of a method of wireless communication. The method may be performed by a UE (e.g., the UE 104/350/402/602; the apparatus 904). At 802, the UE may identify an offset period associated with an NTN cell based on a SIB. For example, 802 may be performed by the component 198 in FIG. 9. Referring to FIG. 6, at 608, the UE 602 may identify an offset period associated with an NTN cell 604 based on a SIB. Further, 802 may correspond to 504 in FIG. 5.

At 808, the UE may identify a TA value associated with the NTN cell for the UE based on a location of the UE and a location of a satellite of the NTN cell. For example, 808 may be performed by the component 198 in FIG. 9. Referring to FIG. 6, at 614, the UE 602 may identify a TA value associated with the NTN cell 604 for the UE 602 based on a location of the UE 602 and a location of a satellite of the NTN cell 604. Further, 808 may correspond to 508 in FIG. 5.

At 810, the UE may identify whether the TA value associated with the NTN cell for the UE is less than the offset period associated with the NTN cell. For example, 810 may be performed by the component 198 in FIG. 9. Referring to FIG. 6, at 616, the UE 602 may identify whether the TA value associated with the NTN cell 604 for the UE 602 is less than the offset period associated with the NTN cell 604. Further, 810 may correspond to 510 in FIG. 5.

At 814, the UE may block the NTN cell for a first duration or until a reboot of the UE if the TA value associated with the NTN cell for the UE is greater than the offset period associated with the NTN cell. For example, 814 may be performed by the component 198 in FIG. 9. Referring to FIG. 6, at 618*a*, the UE 602 may block the NTN cell 604 for a first duration or until a reboot of the UE 602 if the TA value associated with the NTN cell 604 for the UE 602 is greater than the offset period associated with the NTN cell 604. Further, 814 may correspond to 514 in FIG. 5. In one configuration, at 812, the UE may initiate a RACH procedure associated with the NTN cell if the TA value associated with the NTN cell for the UE is less than the offset period associated with the NTN cell. For example, 812 may be performed by the component 198 in FIG. 9. Referring to FIG. 6, at 618*b*, the UE 602 may initiate a RACH procedure associated with the NTN cell 604 if the TA value associated with the NTN cell 604 for the UE 602 is less than the offset period associated with the NTN cell 604. Further, 812 may correspond to 512 in FIG. 5.

In one configuration, at 804, the UE may identify the location of the satellite of the NTN cell based on the SIB. For example, 804 may be performed by the component 198 in FIG. 9. Referring to FIG. 6, at 610, the UE 602 may identify the location of the satellite of the NTN cell 604 based on the SIB. Further, 804 may correspond to 504 in FIG. 5.

In one configuration, the SIB may be a SIB 31.

In one configuration, at 816, the UE may identify, during the first duration, a first cell. A TA value associated with the first cell for the UE may be less than an offset period associated with the first cell. For example, 816 may be performed by the component 198 in FIG. 9. Referring to FIG. 6, at 620, the UE 602 may identify, during the first duration, a first cell 606. Further, 816 may correspond to 516 in FIG. 5.

At 818, the UE may initiate a RACH procedure associated with the first cell. For example, 818 may be performed by the component 198 in FIG. 9. Referring to FIG. 6, at 622, the UE 602 may initiate a RACH procedure associated with the first cell 606.

In one configuration, at 820, the UE may increment a counter in response to identifying, each time, that the TA value associated with the NTN cell for the UE is greater than the offset period associated with the NTN cell. For example, 820 may be performed by the component 198 in FIG. 9. Referring to FIG. 6, at 624, the UE 602 may increment a counter in response to identifying, each time, that the TA value associated with the NTN cell 604 for the UE 602 is greater than the offset period associated with the NTN cell 604. Further, 820 may correspond to 514 in FIG. 5.

At 822, the UE may block the NTN cell for a second duration if the counter reaches a threshold, until a reboot, or permanently. The second duration may be greater than the first duration. For example, 822 may be performed by the component 198 in FIG. 9. Referring to FIG. 6, at 626, the UE 602 may block the NTN cell 604 for a second duration if the counter reaches a threshold, until a reboot, or permanently. Further, 822 may correspond to 518 in FIG. 5.

In one configuration, at 824, the UE may reset the counter in response to the reboot. For example, 824 may be performed by the component 198 in FIG. 9. Referring to FIG. 6, at 628, the UE 602 may reset the counter in response to the reboot. In one configuration, the UE may also reset the timer associated with the second duration in response to the reboot.

In one configuration, at 806, the UE may identify the location of the UE based on a positioning measurement associated with a navigation satellite system. For example, 806 may be performed by the component 198 in FIG. 9. Referring to FIG. 6, at 612, the UE 602 may identify the location of the UE 602 based on a positioning measurement associated with a navigation satellite system. Further, 806 may correspond to 506 in FIG. 5.

Figure 9:
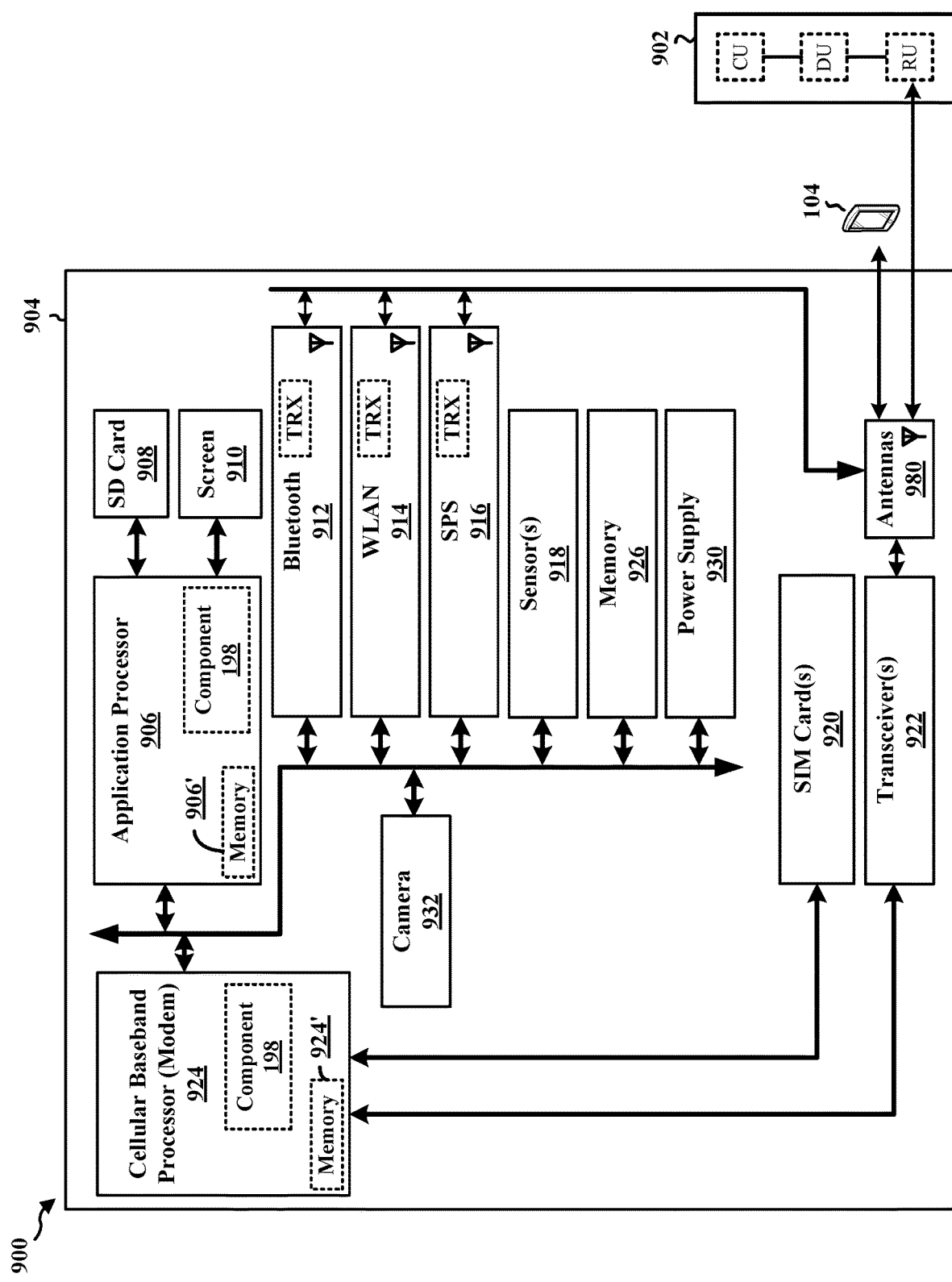
FIG. 9 is a diagram illustrating an example of a hardware implementation for an example apparatus and/or network entity.

FIG. 9 is a diagram 900 illustrating an example of a hardware implementation for an apparatus 904. The apparatus 904 may be a UE, a component of a UE, or may implement UE functionality. In some aspects, the apparatus 904 may include a cellular baseband processor 924 (also referred to as a modem) coupled to one or more transceivers 922 (e.g., cellular RF transceiver). The cellular baseband processor 924 may include on-chip memory 924'. In some aspects, the apparatus 904 may further include one or more subscriber identity modules (SIM) cards 920 and an application processor 906 coupled to a secure digital (SD) card 908 and a screen 910. The application processor 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor 924 communicates through the transceiver(s) 922 via one or more antennas 980 with the UE 104 and/or with an RU associated with a network entity 902. The cellular baseband processor 924 and the application processor 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described supra. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 904 may be a processor chip (modem and/or application) and include just the cellular baseband processor 924 and/or the application processor 906, and in another configuration, the apparatus 904 may be the entire UE (e.g., see UE 350 of FIG. 3) and include the additional modules of the apparatus 904.

As discussed supra, the component 198 may be configured to identify an offset period associated with an NTN cell based on a SIB. The component 198 may be configured to identify a TA value associated with the NTN cell for the UE based on a location of the UE and a location of a satellite of the NTN cell. The component 198 may be configured to identify whether the TA value associated with the NTN cell for the UE is less than the offset period associated with the NTN cell. The component 198 may be configured to block the NTN cell for a first duration or until a reboot of the UE if the TA value associated with the NTN cell for the UE is greater than the offset period associated with the NTN cell. The component 198 may be within the cellular baseband processor 924, the application processor 906, or both the cellular baseband processor 924 and the application processor 906. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 904 may include a variety of components configured for various functions. In one configuration, the apparatus 904, and in particular the cellular baseband processor 924 and/or the application processor 906, may include means for identifying an offset period associated with an NTN cell based on a SIB. The apparatus 904, and in particular the cellular baseband processor 924 and/or the application processor 906, may include means for identifying a TA value associated with the NTN cell for the UE based on a location of the UE and a location of a satellite of the NTN cell. The apparatus 904, and in particular the cellular baseband processor 924 and/or the application processor 906, may include means for identifying whether the TA value associated with the NTN cell for the UE is less than the offset period associated with the NTN cell. The apparatus 904, and in particular the cellular baseband processor 924 and/or the application processor 906, may include means for blocking the NTN cell for a first duration or until a reboot of the UE if the TA value associated with the NTN cell for the UE is greater than the offset period associated with the NTN cell.

In one configuration, the apparatus 904, and in particular the cellular baseband processor 924 and/or the application processor 906, may include means for initiating a RACH procedure associated with the NTN cell if the TA value associated with the NTN cell for the UE is less than the offset period associated with the NTN cell. In one configuration, the apparatus 904, and in particular the cellular baseband processor 924 and/or the application processor 906, may include means for identifying the location of the satellite of the NTN cell based on the SIB. In one configuration, the SIB may be a SIB 31. In one configuration, the apparatus 904, and in particular the cellular baseband processor 924 and/or the application processor 906, may include means for identifying, during the first duration, a first cell, a TA value associated with the first cell for the UE being less than an offset period associated with the first cell. The apparatus 904, and in particular the cellular baseband processor 924 and/or the application processor 906, may include means for initiating a RACH procedure associated with the first cell. In one configuration, the apparatus 904, and in particular the cellular baseband processor 924 and/or the application processor 906, may include means for incrementing a counter in response to identifying, each time, that the TA value associated with the NTN cell for the UE is greater than the offset period associated with the NTN cell. The apparatus 904, and in particular the cellular baseband processor 924 and/or the application processor 906, may include means for blocking the NTN cell for a second duration if the counter reaches a threshold, until a reboot, or permanently. The second duration may be greater than the first duration. In one configuration, the apparatus 904, and in particular the cellular baseband processor 924 and/or the application processor 906, may include means for resetting the counter or a timer associated with the second duration in response to the reboot. In one configuration, the apparatus 904, and in particular the cellular baseband processor 924 and/or the application processor 906, may include means for identifying the location of the UE based on a positioning measurement associated with a navigation satellite system.

The means may be the component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

Referring back to FIGS. 4-9, a UE may identify an offset period associated with an NTN cell based on a SIB. The UE may identify a TA value associated with the NTN cell for the UE based on a location of the UE and a location of a satellite of the NTN cell. The UE may identify whether the TA value associated with the NTN cell for the UE is less than (or equal to) the offset period associated with the NTN cell. The UE may block the NTN cell for a first duration or until a reboot of the UE if the TA value associated with the NTN cell for the UE is greater than the offset period associated with the NTN cell. Accordingly, as the UE may avoid initiating the RACH procedure where causality would be violated, power and UE resources may be saved. Further, the overall traffic on the expensive satellite link may be reduced as the unnecessary Msg1 transmissions may be avoided. Moreover, the chances for the UE to find a suitable cell (e.g., a cell for which the RACH procedure may be successfully completed without a large number of retires) may also be improved.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only. A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising identifying an offset period associated with an NTN cell based on a SIB; identifying a TA value associated with the NTN cell for the UE based on a location of the UE and a location of a satellite of the NTN cell; identifying whether the TA value associated with the NTN cell for the UE is less than the offset period associated with the NTN cell; and blocking the NTN cell for a first duration or until a reboot of the UE if the TA value associated with the NTN cell for the UE is greater than the offset period associated with the NTN cell.

Aspect 2 is the method of aspect 1, further including: initiating a RACH procedure associated with the NTN cell if the TA value associated with the NTN cell for the UE is less than the offset period associated with the NTN cell.

Aspect 3 is the method of any of aspects 1 and 2, further including: identifying the location of the satellite of the NTN cell based on the SIB.

Aspect 4 is the method of any of aspects 1 to 3, where the SIB is a SIB 31.

Aspect 5 is the method of any of aspects 1, 3, and 4, further including: identifying, during the first duration, a first cell, a TA value associated with the first cell for the UE being less than an offset period associated with the first cell; and initiating a RACH procedure associated with the first cell.

Aspect 6 is the method of any of aspects 1 and 3 to 5, further including: incrementing a counter in response to identifying, each time, that the TA value associated with the NTN cell for the UE is greater than the offset period associated with the NTN cell; and blocking the NTN cell for a second duration if the counter reaches a threshold, until a reboot, or permanently, where the second duration is greater than the first duration.

Aspect 7 is the method of aspect 6, further including: resetting the counter or a timer associated with the second duration in response to the reboot.

Aspect 8 is the method of any of aspects 1 to 7, further including: identifying the location of the UE based on a positioning measurement associated with a navigation satellite system.

Aspect 9 is an apparatus for wireless communication including at least one processor coupled to a memory and, based at least in part on information stored in the memory, the at least one processor is configured to implement a method as in any of aspects 1 to 8.

Aspect 10 may be combined with aspect 9 and further includes a transceiver coupled to the at least one processor.

Aspect 11 is an apparatus for wireless communication including means for implementing any of aspects 1 to 8.

Aspect 12 is a non-transitory computer-readable storage medium storing computer executable code, where the code when executed by a processor causes the processor to implement any of aspects 1 to 8.

Various aspects have been described herein. These and other aspects are within the scope of the following claims.

What is claimed is:

1. An apparatus for wireless communication at a user equipment (UE), comprising:
   memory; and
   at least one processor coupled to the memory and, based at least in part on information stored in the memory, the at least one processor is configured to:
      identify an offset period associated with a non-terrestrial network (NTN) cell based on a system information block (SIB);
      identify a timing advance (TA) value associated with the NTN cell for the UE based on a location of the UE and a location of a satellite of the NTN cell;
      identify whether the TA value associated with the NTN cell for the UE is less than the offset period associated with the NTN cell;
      increment a counter in response to identifying, each time, that the TA value associated with the NTN cell for the UE is greater than the offset period associated with the NTN cell;
      block the NTN cell for a first duration or until a reboot of the UE if the TA value associated with the NTN cell for the UE is greater than the offset period associated with the NTN cell; and
      block the NTN cell for a second duration if the counter reaches a threshold, until a reboot, or permanently, wherein the second duration is greater than the first duration.

2. The apparatus of claim 1, the at least one processor being further configured to:
   initiate a random access channel (RACH) procedure associated with the NTN cell if the TA value associated with the NTN cell for the UE is less than the offset period associated with the NTN cell.

3. The apparatus of claim 1, the at least one processor being further configured to:
   identify the location of the satellite of the NTN cell based on the SIB.

4. The apparatus of claim 1, wherein the SIB is a SIB 31.

5. The apparatus of claim 1, the at least one processor being further configured to:
   identify, during the first duration, a first cell, a TA value associated with the first cell for the UE being less than an offset period associated with the first cell; and
   initiate a random access channel (RACH) procedure associated with the first cell.

6. The apparatus of claim 1, the at least one processor being further configured to:
   reset the counter or a timer associated with the second duration in response to the reboot.

7. The apparatus of claim 1, the at least one processor being further configured to:

identify the location of the UE based on a positioning measurement associated with a navigation satellite system.

8. A method of wireless communication at a user equipment (UE), comprising:
identifying an offset period associated with a non-terrestrial network (NTN) cell based on a system information block (SIB);
identifying a timing advance (TA) value associated with the NTN cell for the UE based on a location of the UE and a location of a satellite of the NTN cell;
identifying whether the TA value associated with the NTN cell for the UE is less than the offset period associated with the NTN cell;
incrementing a counter in response to identifying, each time, that the TA value associated with the NTN cell for the UE is greater than the offset period associated with the NTN cell;
blocking the NTN cell for a first duration or until a reboot of the UE if the TA value associated with the NTN cell for the UE is greater than the offset period associated with the NTN cell; and
blocking the NTN cell for a second duration if the counter reaches a threshold, until a reboot, or permanently, wherein the second duration is greater than the first duration.

9. The method of claim 8, further comprising:
initiating a random access channel (RACH) procedure associated with the NTN cell if the TA value associated with the NTN cell for the UE is less than the offset period associated with the NTN cell.

10. The method of claim 8, further comprising:
identifying the location of the satellite of the NTN cell based on the SIB.

11. The method of claim 8, wherein the SIB is a SIB 31.

12. The method of claim 8, further comprising:
identifying, during the first duration, a first cell, a TA value associated with the first cell for the UE being less than an offset period associated with the first cell; and
initiating a random access channel (RACH) procedure associated with the first cell.

13. The method of claim 9, further comprising:
resetting the counter or a timer associated with the second duration in response to the reboot.

14. The method of claim 8, further comprising:
identifying the location of the UE is based on a positioning measurement associated with a navigation satellite system.

15. An apparatus for wireless communication at a user equipment (UE), comprising:
means for identifying an offset period associated with a non-terrestrial network (NTN) cell based on a system information block (SIB);
means for identifying a timing advance (TA) value associated with the NTN cell for the UE based on a location of the UE and a location of a satellite of the NTN cell;
means for identifying whether the TA value associated with the NTN cell for the UE is less than the offset period associated with the NTN cell;
means for incrementing a counter in response to identifying, each time, that the TA value associated with the NTN cell for the UE is greater than the offset period associated with the NTN cell;
means for blocking the NTN cell for a first duration or until a reboot of the UE if the TA value associated with the NTN cell for the UE is greater than the offset period associated with the NTN cell; and
means for blocking the NTN cell for a second duration if the counter reaches a threshold, until a reboot, or permanently, wherein the second duration is greater than the first duration.

16. The apparatus of claim 15, further comprising:
means for initiating a random access channel (RACH) procedure associated with the NTN cell if the TA value associated with the NTN cell for the UE is less than the offset period associated with the NTN cell.

17. The apparatus of claim 15, further comprising:
means for identifying the location of the satellite of the NTN cell based on the SIB.

18. The apparatus of claim 15, wherein the SIB is a SIB 31.

19. The apparatus of claim 15, further comprising:
means for identifying, during the first duration, a first cell, a TA value associated with the first cell for the UE being less than an offset period associated with the first cell; and
means for initiating a random access channel (RACH) procedure associated with the first cell.

20. The apparatus of claim 15, further comprising:
means for resetting the counter or a timer associated with the second duration in response to the reboot.

21. The apparatus of claim 15, further comprising:
means for identifying the location of the UE is based on a positioning measurement associated with a navigation satellite system.

22. A non-transitory computer-readable medium storing computer executable code at a user equipment (UE), the code when executed by a processor causes the processor to:
identify an offset period associated with a non-terrestrial network (NTN) cell based on a system information block (SIB);
identify a timing advance (TA) value associated with the NTN cell for the UE based on a location of the UE and a location of a satellite of the NTN cell;
identify whether the TA value associated with the NTN cell for the UE is less than the offset period associated with the NTN cell;
increment a counter in response to identifying, each time, that the TA value associated with the NTN cell for the UE is greater than the offset period associated with the NTN cell;
block the NTN cell for a first duration or until a reboot of the UE if the TA value associated with the NTN cell for the UE is greater than the offset period associated with the NTN cell; and
block the NTN cell for a second duration if the counter reaches a threshold, until a reboot, or permanently, wherein the second duration is greater than the first duration.

23. The computer-readable medium of claim 22, the code further causing the processor to:
initiate a random access channel (RACH) procedure associated with the NTN cell if the TA value associated with the NTN cell for the UE is less than the offset period associated with the NTN cell.

24. The computer-readable medium of claim 22, the code further causing the processor to:
identify the location of the satellite of the NTN cell based on the SIB.

25. The computer-readable medium of claim 22, wherein the SIB is a SIB 31.

26. The computer-readable medium of claim 22, the code further causing the processor to:

identify, during the first duration, a first cell, a TA value associated with the first cell for the UE being less than an offset period associated with the first cell; and initiate a random access channel (RACH) procedure associated with the first cell.

* * * * *